(12) United States Patent
Myers

(10) Patent No.: US 7,500,261 B1
(45) Date of Patent: Mar. 3, 2009

(54) MULTI-POINT MULTI-CHANNEL DATA DISTRIBUTION SYSTEM

(75) Inventor: Steven Duane Myers, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 980 days.

(21) Appl. No.: 10/020,030

(22) Filed: Oct. 30, 2001

(51) Int. Cl.
*H04N 7/173* (2006.01)
*H04H 20/28* (2008.01)
*H04N 7/16* (2006.01)
*H04N 7/20* (2006.01)
*G08C 17/00* (2006.01)
*H04B 7/216* (2006.01)

(52) U.S. Cl. .......................... 725/105; 725/62; 725/63; 725/65; 725/73; 725/123; 370/487; 370/311; 370/320

(58) Field of Classification Search ............. 725/74–85, 725/105, 62, 63, 65, 73, 123; 370/311, 320, 370/487
See application file for complete search history.

(56) References Cited

U.S. PATENT DOCUMENTS

| | | | | |
|---|---|---|---|---|
| 5,706,048 | A | | 1/1998 | Davis ........................... 348/12 |
| 6,069,621 | A | * | 5/2000 | Schupak ....................... 715/717 |
| 6,072,784 | A | * | 6/2000 | Agrawal et al. .............. 370/311 |
| 6,088,346 | A | * | 7/2000 | Du et al. ....................... 370/338 |
| 6,124,878 | A | * | 9/2000 | Adams et al. ................. 725/118 |
| 6,201,536 | B1 | * | 3/2001 | Hendricks et al. ........... 715/716 |
| 6,393,158 | B1 | * | 5/2002 | Gould et al. ................. 382/254 |
| 6,411,616 | B1 | * | 6/2002 | Donahue et al. ............. 370/352 |
| 6,763,025 | B2 | * | 7/2004 | Leatherbury et al. ... 370/395.64 |
| 6,857,132 | B1 | * | 2/2005 | Rakib et al. .................. 725/114 |
| 6,930,788 | B1 | * | 8/2005 | Iwamoto et al. ............. 358/1.15 |
| 7,012,891 | B1 | * | 3/2006 | Chandran et al. ............ 370/230 |
| 2001/0051037 | A1 | * | 12/2001 | Safadi et al. ................... 386/83 |
| 2002/0062483 | A1 | * | 5/2002 | Ishizaki et al. ............... 725/105 |
| 2002/0124262 | A1 | * | 9/2002 | Basso et al. .................. 725/109 |
| 2003/0046706 | A1 | * | 3/2003 | Rakib ........................... 725/111 |

* cited by examiner

*Primary Examiner*—Hoang-Vu A Nguyen-Ba

(57) ABSTRACT

A system for the efficient distribution of live and stored audio/video streams to multiple subscribers without degrading normal data delivery services. The system segments one or more frequency bands into sub-bands, or channels, each of which is capable of carrying encoded audio, video, and other data streams, to a plurality of subscribers. Each channel transmitted in the system provides full-duplex operation so that each subscriber may indicate what specific services are desired, such as audio/video broadcast, two-way data transfer, video library access, pay-per-view video, interactive video, and audio file transfer. A transmission headend facility ('hub') broadcasts multiple channels of video/audio data (e.g., Internet data) in unicast mode via a shared media transmission facility to multiple subscribers. Simultaneously, selected video/audio/data is transmitted in Internet Protocol multicast mode over one or more channels of the segmented frequency band. The subscriber is provided a device which simultaneously and dynamically demodulates 2 or more channels and interleaves the information over a single ethernet interface connected to one or more IP enabled devices. Each subscriber thus has the capability of, for example, receiving a video stream concurrent with many other subscribers while simultaneously interacting uniquely with the Internet or other data network.

14 Claims, 7 Drawing Sheets

MULTI-POINT MULTI-CHANNEL DATA DISTRIBUTION SYSTEM

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates generally to telecommunications systems, and more particularly to a system for providing direct transmission of multiple encoded video, audio, and other data streams to a plurality of subscribers over a shared media.

BACKGROUND OF THE INVENTION

It is presently a problem to efficiently deliver live and/or stored video and other data streams of common interest to multiple subscribers without degrading normal data delivery services. In existing multipoint data distribution systems, use of available bandwidth is not optimal because data is redundantly transmitted. For example, in a present broadband data system, duplicate video streams are sent with each request for viewing through a process known as unicast. In order to deliver a message to n destinations via a unicast transmission, n transmissions of the same message are transmitted.

Furthermore, shared media multipoint data distribution systems such as cable and broadband wireless are bandwidth limited on a per channel basis. Therefore, bandwidth is wasted anytime more than one user requests the same video/audio/data stream. This in turn reduces the overall bandwidth available to other users sharing the same channel for their individual interests.

SUMMARY OF THE INVENTION

The present invention overcomes the aforementioned problems of the prior art and achieves an advance in the field by providing a system for the efficient distribution of live and stored audio/video streams to multiple subscribers without degrading normal data delivery services. The present system segments one or more frequency bands into sub-bands, or channels, each of which is capable of carrying encoded audio, video, and other data streams, to a plurality of subscribers. Each channel transmitted in the present system provides full-duplex operation so that each subscriber may indicate what specific services are desired, such as audio/video broadcast, two-way data transfer, video library access, pay-per-view video, interactive video, and audio file transfer.

In operation, a transmission headend facility ('hub') broadcasts multiple channels of video/audio data (e.g., Internet data) in unicast mode via a shared media transmission facility (wireless, cable, etc.) to multiple subscribers. Simultaneously, selected video/audio/data (e.g., pay-per view) is transmitted in IP (Internet Protocol) multicast mode over one or more channels of the segmented frequency band. The subscriber is provided a device (a 'subscriber unit') which simultaneously and dynamically demodulates 2 or more channels (on different frequencies) and interleaves the information over a single ethernet interface connected to one or more IP enabled devices. Each subscriber thus has the capability of, for example, receiving a video stream concurrent with many other subscribers while simultaneously interacting uniquely with the Internet or other data network. A number of subscribers may thus simultaneously share the same interactive channel without performance degradation, up to the limit of the subscriber network. In an alternate embodiment of the present system, an IP enabled television set or subscriber unit (e.g., a set top box, etc.) at multiple subscribers' premises may receive a digitally encoded video on the multicast channel at the same time multiple subscriber's computers are sending or receiving data via shared unicast channels.

In one optional aspect of the present system, the headend schedules a wide variety of data services which include full-duplex or asymmetrical transmission of interactive, on-demand, pay-per-view video services, audio file transfer, etc. In response to receiving a subscriber request for a particular service, the subscriber unit allows the multicast transmission to pass through to the subscriber's local network. Otherwise the multicast transmission channel(s) are ignored by the subscriber unit. For real-time broadcasts, the headend authorizes access to the requested broadcast stream(s) using a subscriber's permissions profile.

The present system uses IP multicasting and video compression technology to simultaneously deliver from approximately 7 to 100 video streams at data rates of approximately 300 Kbps to 4 Mbps, thereby optimizing bandwidth use in a multipoint data distribution system. The customer premises equipment for each subscriber includes two demodulators which convert the two received channels from RF back to IP-formatted data streams appropriate for the intended receiving devices such as a personal computer ('PC') and/or other IP enabled appliance.

DETAILED DESCRIPTION OF THE PREFERRED EMBODIMENTS

Figure 1:
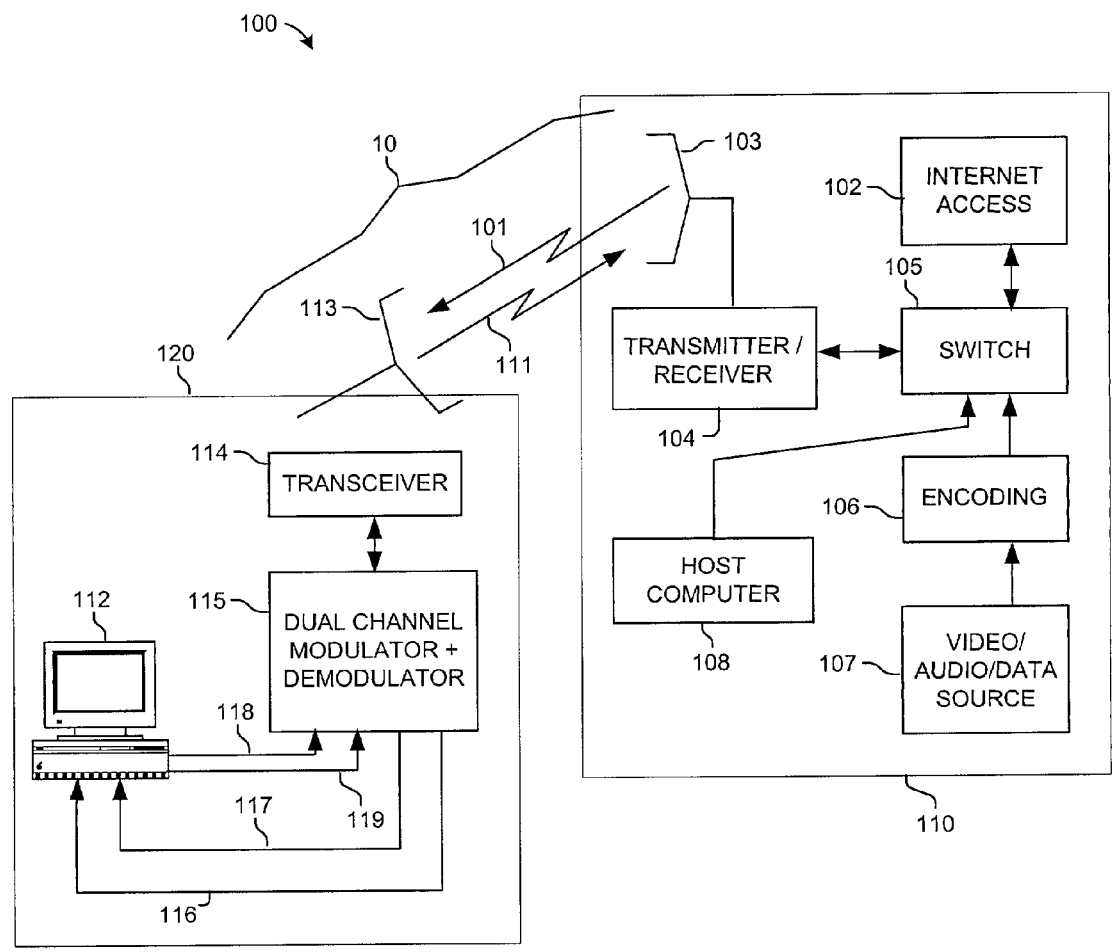
FIG. 1 is a conceptual diagram of the present system.

FIG. 1 is a conceptual diagram of the present system 100, which delivers multicast and unicast information to a plurality of subscribers in a bandwidth efficient manner. In an exemplary embodiment, the present system segments one or more frequency bands into sub-bands, or channels, each of which is capable of carrying encoded audio, video, and other data streams, to a plurality of subscribers. Each channel transmitted in the present system provides full-duplex operation so that each subscriber may indicate what specific services are desired, such as audio/video broadcast, two-way data transfer, video library access, pay-per-view video, interactive video, and audio file transfer.

An exemplary embodiment of the present system uses multicasting and video compression technology to simultaneously deliver from 7 to 100 video streams at data rates of 300 Kbps to 4 Mbps, thereby optimizing bandwidth use in a multipoint data distribution system.

As shown in FIG. 1, headend (hub) 110 sends multicast and unicast data 101 to a plurality of subscriber sites 120 (only one of which is shown) via communication link 10 comprising transmitter/receiver 104, antennas 103 and 113, and transceiver 114. Data 111 is transmitted from subscriber site 120 to headend 110 via the same link 10. In operation, the transmission headend facility 110 transmits multiple channels of video, audio, or other data (e.g., Internet data) in unicast mode via a shared media transmission facility (wireless, cable, etc.) to multiple subscribers via a segmented frequency band. Simultaneously, selected video/audio/data (e.g., pay-per view) is transmitted in multicast mode over one or more channels of the segmented frequency band. The information on each of the channels is formatted in accordance with Internet protocol (IP) for addressing purposes. The use of IP addressing allows the present system to send data over the Internet as well as by RF transmission.

In an exemplary embodiment, the present system 100 delivers two non-multiplexed RF data channels 101 from headend 110 to subscriber site equipment 112-119 that receives and demodulates the two RF channels simultaneously, then multiplexes the two demodulated channels onto a single Ethernet interface. Any IP-addressable device may be connected to the Ethernet interface to receive one or both of the signals. The present system thus efficiently delivers multicast data of common interest to a plurality of recipients while not significantly impacting the performance of delivery of data to individual unicast data recipients.

In an alternative embodiment, the present system 100 transmits a signal using a coded modulation technique such as code-division multiple access (CDMA) or synchronous code-division multiple access (S-CDMA, a proprietary version of CDMA). Coded modulation is a technique whereby forward error correcting (FEC) coding techniques are integrated with the channel modulation, allowing schemes to be devised which are both bandwidth and power efficient. CDMA is a coding scheme, used as a modulation technique, in which multiple channels are independently coded for transmission over a single wideband channel. CDMA is a spread-spectrum approach to user multiplexing. Users in a CDMA environment simultaneously share the same radio frequency band and can be separated at the receiver end with the knowledge of their unique code. Other modulation methods, including digital modulation techniques such as orthogonal frequency-division multiplexing (OFDM) may also be employed for simultaneous delivery of unicast and multicast data in accordance with the present system.

Headend 110 includes a switch 105 for controlling data flow between subscriber sites 120 and information sources such as the Internet (via Internet access or other data source 102) and other video/audio/data sources 107. Information (from sources 107) that does not originate on the Internet is formatted with appropriate IP addressing information and packetized by encoding equipment 106.

In the exemplary embodiment shown in FIG. 1, each subscriber site 120 includes a dual channel modulator/single channel demodulator 115 for converting the two data channels from RF to digital signals. Downstream data 101 from headend 110 is sent to subscriber site 120 via link 10 and demodulated into a unicast component signal 117 and a second component signal 116, both of which are in an IP format. The second component signal is typically a multicast signal, but this signal can be a broadcast, or other type of signal of common interest to more than 1 recipient. Subscriber data receiving device 112, which can be a standard personal computer (PC) or a television set with an IP-enabled set-top box, receives transmissions having a subscriber site's specific IP address(es). In the case where a single device, such as a PC, simultaneously receives both unicast and multicast channels, the device requires two network interface cards ('NIC's or other means for uniquely identifying a particular device on a network), each set to a different IP address. Subscriber data receiving device 112 may send IP-formatted data signals 118 and 119 (shown collectively as signal 111) upstream via link 10 to headend 110. Upstream signals 118 and 119 are return channels typically corresponding to the received multicast signal 116 and unicast signal 117, respectively.

Figure 2:
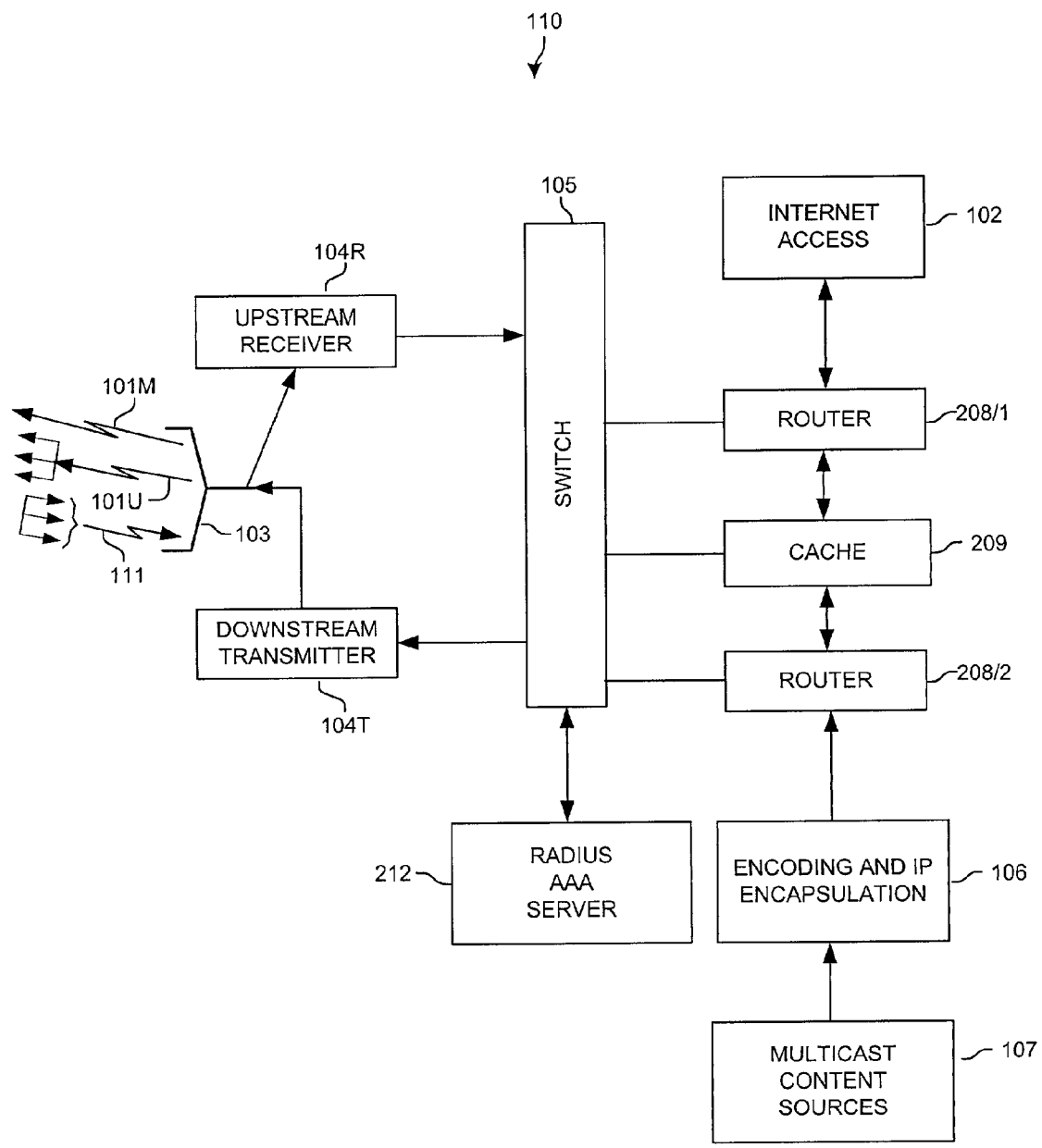
FIG. 2 is a block diagram illustrating typical components utilized at the headend or hub of the present system.

FIG. 2 is a block diagram illustrating typical components utilized at the headend of the present system 100. As shown in FIG. 2, multicast content such as pay television or video-on-demand data originating from non IP-formatted sources 107 is encoded (formatted) and encapsulated (packetized) by equipment 106 that is well-known in the art. Routers 208/1 and 208/2, and cache memory 209 are employed to direct and temporarily store data being transferred between data sources 102/107 and switch 105. Host computer 108 may be used to control and monitor various aspects of system operation including setting up membership in multicast groups, as explained below with respect to FIG. 7.

In an exemplary embodiment of the present system, downstream transmitter 104T sends a plurality of unicast signals on channels 101U and a single multicast channel 101M to a plurality of subscriber sites 120 via antenna 103. In an alternative embodiment of the present system, antenna 103 is replaced by an Internet link or other network, as described below with respect to FIG. 7.

A plurality of channels of IP-formatted data 111 from various subscriber sites 120 are received by upstream receiver 104R. Return channel server 212 is used for processing upstream data from subscriber sites 120, for example, to determine subscriber identities and for scheduling subscriber-requested programming.

In one optional aspect of the present system, headend 110 schedules a wide variety of data services which include full-duplex or asymmetrical transmission of interactive, on-demand, pay-per-view video services or other programming content, audio file transfer, etc. In response to receiving a subscriber request for a particular service, a subscriber unit 300 (described below with respect to FIG. 3) allows the multicast transmission to pass through to the subscriber's local network. Otherwise, the multicast transmission channel(s) are ignored by the subscriber unit. For real-time broadcasts, the headend authorizes access to the requested broadcast stream(s) using a subscriber's permissions profile by initiating a join request which is subsequently authenticated and authorized by server 212 using standard AAA (authentication, authorization, accounting) mechanisms such as RADIUS.

Figure 3:
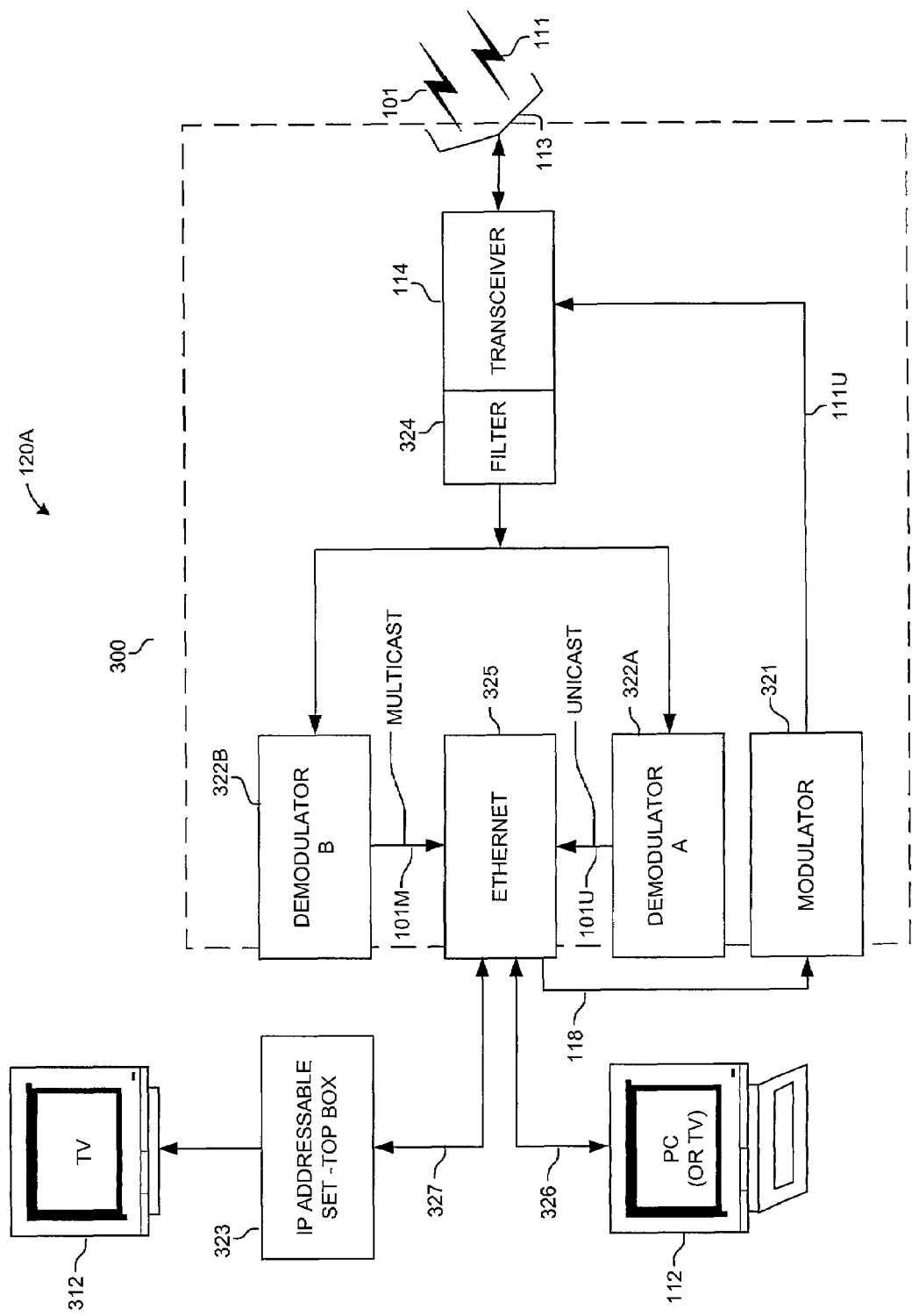
FIG. 3 is a block diagram illustrating exemplary components used for demodulating and distributing a received multi-channel signal at a subscriber site.

FIG. 3 is a block diagram illustrating components used for demodulating and distributing a received multi-channel signal at a subscriber site 120A in an exemplary embodiment of the present system. In the embodiment shown in FIG. 3, each subscriber site 120A is provided with a device (a 'subscriber unit') 300 which receives RF signals 101M and 101U on different frequencies. The exemplary embodiment of FIG. 3 includes a television set 312 and a PC 112 connected to subscriber unit 300 via an Ethernet link 325/326/327. Note that any IP-addressable device may be used in lieu of TV 312 or PC 112. In operation, transceiver 114 receives signal 101 comprising a plurality of unicast channels 101U and a multicast channel 101M. The received signals are simultaneously and dynamically demodulated and interleaved over a single local network interface 325 connected to one or more IP enabled devices 112/312.

Subscriber unit 300 is programmed as to which two downstream channels 101M/101U it will be demodulating. The two signals are selected by transceiver 114 which also controls when it will pass the information on through to the local network 325/326/327. Subscriber unit 300 multiplexes the received data from both downstream channels onto the local subscriber network. Local network 325/326/327 typically employs an Ethernet bus, but the network could, alternatively, be any type of local network, including wireless LANs such as those conforming to the IEEE draft standard 802.11.

The plurality of unicast signals on channels 101U may, optionally, be filtered by a programmable filter 324 in transceiver 114, so that the only unicast channel sent to ethernet link 325 is the channel containing the unicast information intended for the specific subscriber site 120A. A mechanism such as a digital filter (having an encoded subscriber ID, or using a subscriber IP address) may be provided for ensuring that a given subscriber does not have access to other subscriber's unicast channels.

Although, in the embodiment of FIG. 3, the plurality of unicast channels 101U are transmitted to all subscribers, a given subscriber PC or TV receives only the unicast subchannel intended for that specific subscriber, as filtered by transceiver filter 324, if present, and which has an IP address that matches the IP address of the subscriber site equipment. Each subscriber site has a unique identifier included in the IP address that is encoded in each transmission from headend 110. PC (or TV) 112 and set-top box 323 thus receive only the signal having the IP destination address that matches the IP address used by the IP-addressable set-top box 323 or the subscriber's network interface card ('NIC', not shown) in PC 112.

Transceiver 114 also receives multicast transmissions on an RF channel that is separate from the unicast transmissions. In order to receive a particular multicast transmission, an IP-addressable recipient (PC 112 or set-top box 323) at the subscriber site 120A sets its IP process and network interface card (NIC) to receive the multicast on a specific group's address and port, as explained below in detail. PC 112 and/or set-top box 323 receive only multicast transmissions having an IP address that PC 112 and/or set-top box 323 have designated as being of interest.

After being received by transceiver 114, signal 101, containing the unicast signal 101U and the multicast signal 101M, is sent to demodulators 322A and 322B, which demodulate the received signal into unicast signal 101U and multicast signal 101M, and multiplex the digital signals onto the Ethernet link 325. Demodulators 322A and 322B may be a single device, i.e., a dual channel demodulator. Ethernet link 325 is then used to deliver the digital signals 101U and 101M to PC 112 and set-top box 323, respectively, via Ethernet connections 326 and 327. Modulator 321 is used for modulation of signals (e.g., Internet upstream transmissions or on-demand requests) sent from PC 112 upstream to headend 110 via channel 111U.

The above-described system allows each subscriber to have the capability of, for example, receiving a video stream concurrent with many other subscribers while simultaneously interacting uniquely with the Internet or other data network. A number of subscribers may therefore simultaneously share the same interactive transmission medium with the ability to opt-in to a second service simultaneous with a primary service without interruption or degradation of the primary service.

Figure 4:
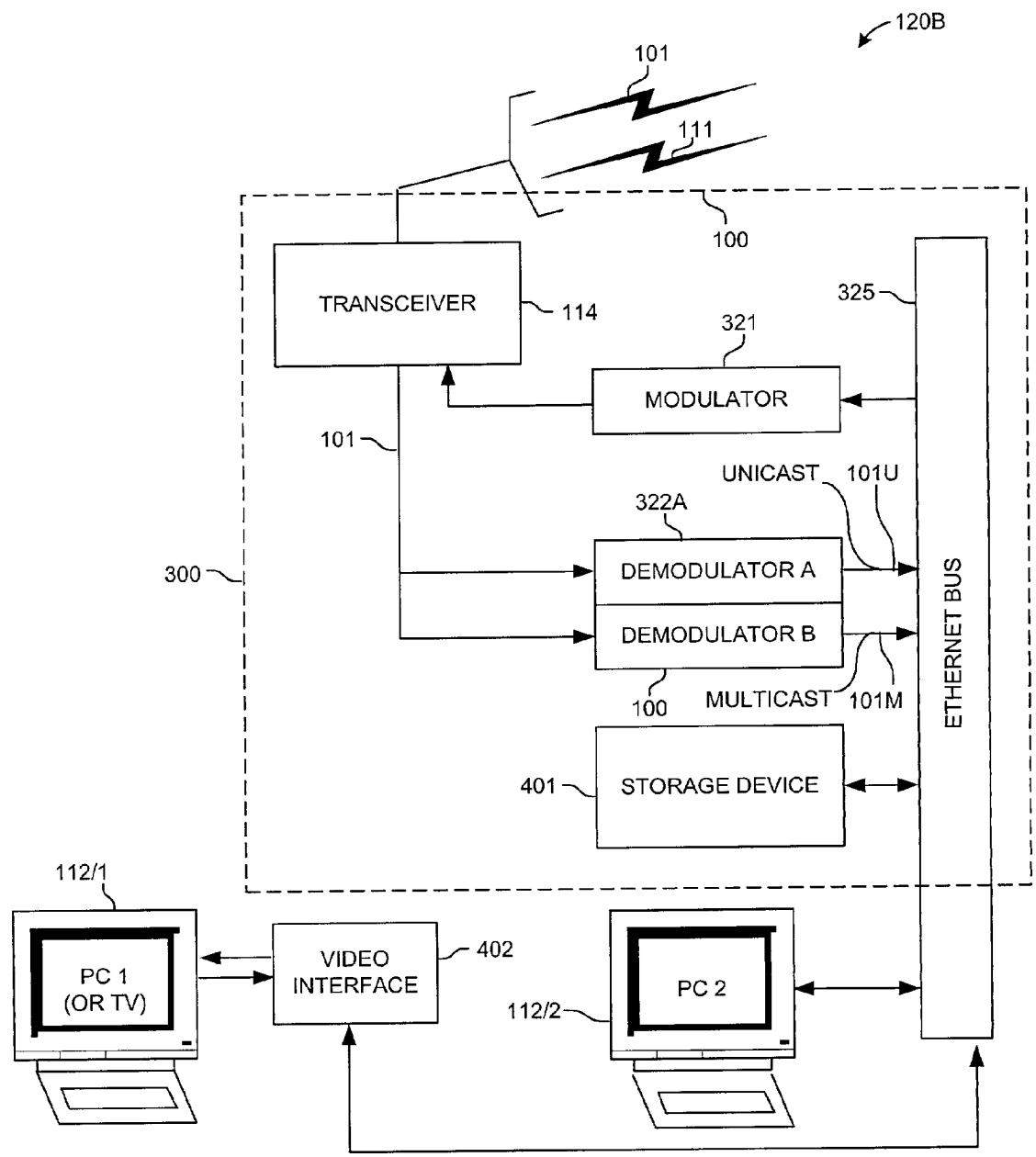
FIG. 4 is a block diagram illustrating subscriber site components used in an alternative embodiment of the present system.

FIG. 4 is a block diagram illustrating subscriber site components used in distributing a received multi-channel signal at a subscriber site 120B in an alternative embodiment of the present system. As shown in FIG. 4, two PCs 112/1 and 112/2 are coupled to subscriber unit 300. Alternatively, device 112/1 can be a television set, in which case video interface is the same as set-top box 323 shown in FIG. 3. Subscriber unit 300 comprises transceiver 114, modulator 321, demodulators 322A and 322B, storage device 401, and Ethernet bus 325. In the exemplary embodiment of FIG. 4, PC1 (or TV) 112/1 and PC2 112/2 are connected to the components in subscriber unit 300 via Ethernet bus 325.

In operation, transceiver 114 receives signal 101 comprising a unicast channel 101U and a multicast channel 101M. These signals are demodulated and placed on Ethernet bus 325, as explained above with respect to FIG. 3. When device 112/1 is a PC, a video interface card 402 converts received digital television signal into a signal appropriate for displaying video images on the device's video monitor.

Storage device 401 is a disk drive, rewriteable DVD (digital Video disk), or the like, for storing video and audio information. Storage device 401 may be employed to effect time-shifting of programming by storing a received program and playing back the stored program at a later time.

Figure 5:
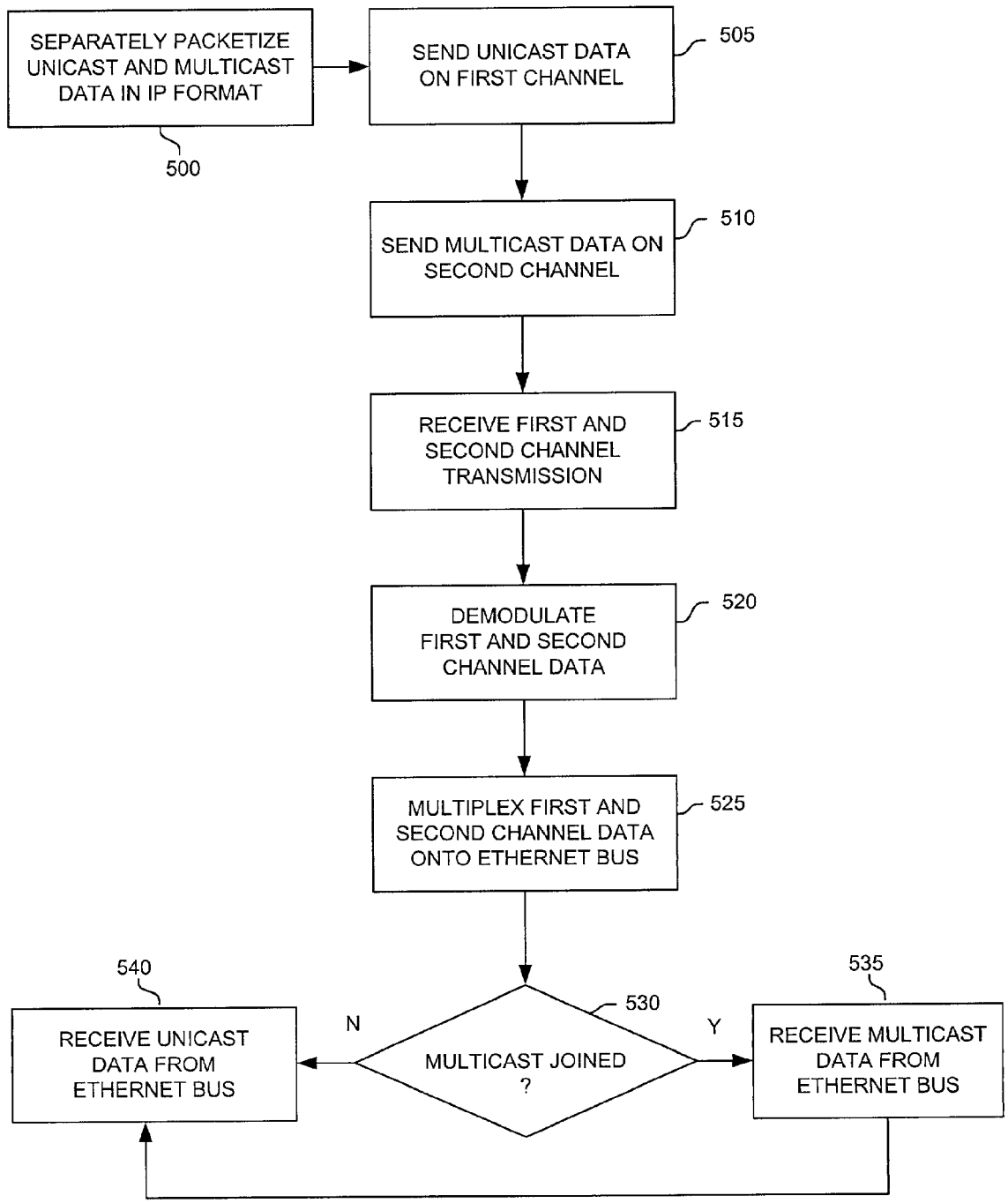
FIG. 5 is a flowchart illustrating basic operation of the present system.

FIG. 5 is a flowchart illustrating basic operation of the present system. As shown in FIG. 5, at step 500, unicast and multicast data are separately packetized and encoded in IP format by encoding equipment 106 at headend 110. At step 505, unicast data, such as an Internet transmission, is sent from the headend via one of the plurality of channels 101U. Multicast data is sent from headend 110 via channel 101M, at step 510, which occurs simultaneously with the transmission of unicast data. Next, both unicast and multicast channels are received at each of the subscriber sites 120/120A/120B (hereinafter generically referred to by reference number 120*), at step 515. As explained above with respect to FIGS. 3 and 4, at step 520, the data on channels 101U and 101M is then demodulated at the subscriber sites, and at step 525, the demodulated data is multiplexed onto an Ethernet bus.

At step 530, if a particular subscriber site has 'joined' the multicast transmission (as explained below with respect to FIG. 7), then at step 535, the multicast data is received by the appropriate subscriber site PC/TV. At step 540, unicast data is received by the PC or set-top box having the IP address encoded in channel 101U.

Figure 6:
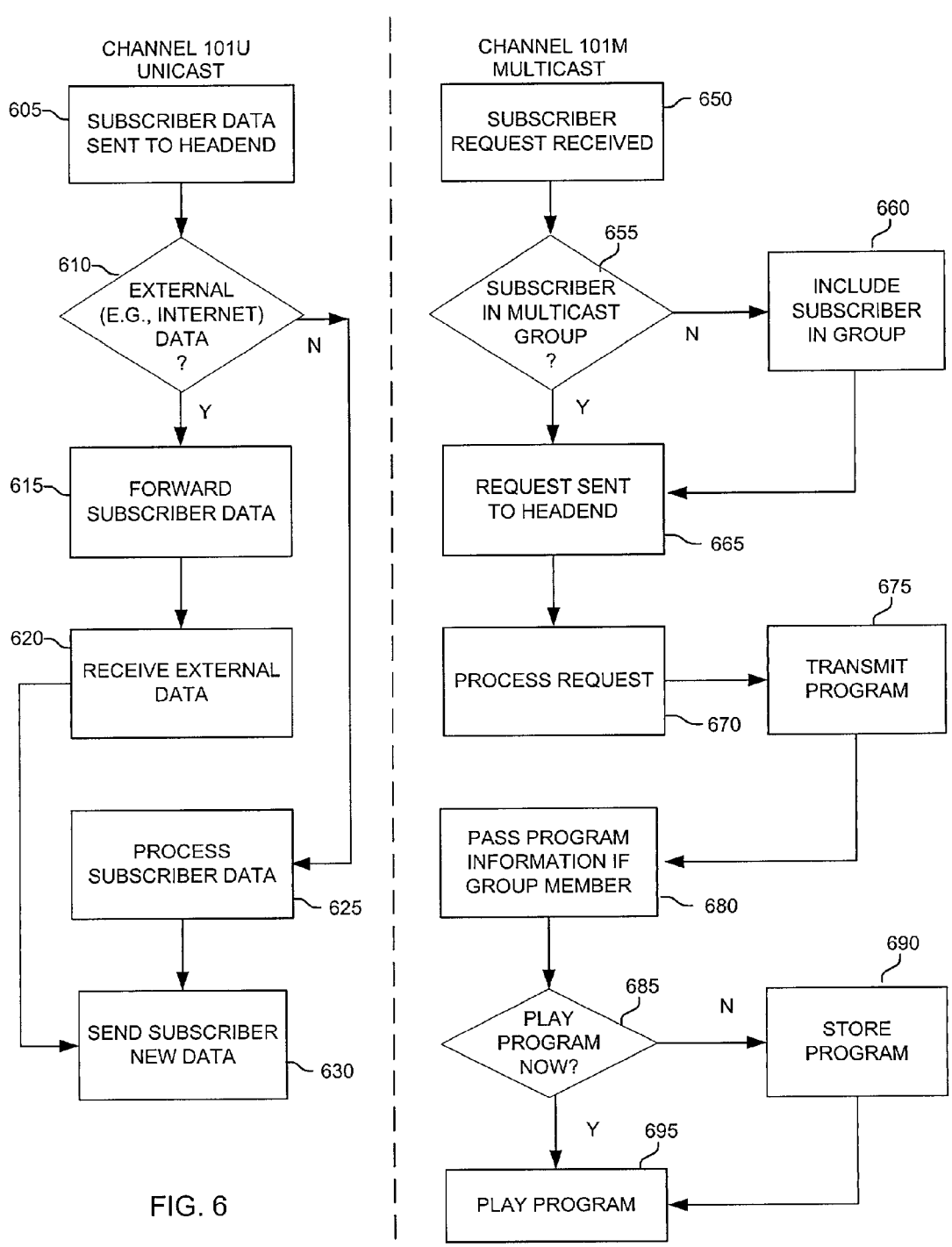
FIG. 6 is a flowchart illustrating an exemplary sequence of steps performed by the present system in asynchronously processing subscriber requests for audio, video, or other information via a unicast channel and a multicast channel.

FIG. 6 is a flowchart illustrating an exemplary sequence of steps performed by the present system in asynchronously processing subscriber requests for audio, video, or other information via a unicast channel and a multicast channel. The blocks to the left of the vertical dotted line in FIG. 6 illustrate steps preformed with respect to the transmission of unicast data, and the blocks to the right of the dotted line illustrate the transmission of multicast data. Note that the data on the unicast channel is not interleaved with the data on the multicast channel at the RF level. The content or data contained on both channels is interleaved at the local network level by subscriber unit 300, as described above.

As shown in FIG. 6, at step 605, data is received at headend 110 from a subscriber site 120*, via one of the upstream channels 111. At step 610, if the received subscriber data is 'external' data, such as Internet data (i.e., data not intended for processing by the headend facility), then at step 615 the data is forwarded to the appropriate destination. Otherwise, the received subscriber data is processed by return channel server 212, at step 625. If a particular subscriber is transmitting and receiving external data, e.g., via the Internet, then data (if any) is received from Internet access or other external data source 102, at step 620. At step 630, new data, either from external source 102 or from return channel server 212, is sent to the subscriber site via the appropriate unicast channel 101U.

Multicast data is transmitted from headend 110 simultaneously and asynchronously relative to the transmission of unicast data. Detailed aspects of multicast operation are described below with respect to FIG. 7. As shown in FIG. 6, at step 650, a subscriber request for audio, video, or other programming is received via channel 111 by return channel server 212. At step 655, if the subscriber of interest has not already joined a multicast group, then at step 660, the subscriber is included in the appropriate group, and at step 665, the subscriber request for programming is sent via channel 111 to headend 110. At step 670, the subscriber request is then received and processed by return channel server 212. When the requested program is available, at step 675, the program information is transmitted via channel 101M to a plurality of subscriber sites 120. At step 680, each subscriber site that has joined the present multicast group allows the multicast program to be passed through the appropriate PC 112* or set-top box 323. Because the subscriber unit 300 and/or client software in a PC 112 is multicast enabled, the subscriber either receives or ignores the multicast data. Even if the data on channel 101M is not a standards-based multicast, (e.g., if a proprietary transmission protocol and client software are employed) the above-described process still applies. It also allows unicast data to flow simultaneously on the same ethernet link.

At step 685, if the subscriber site has scheduled the program for the present time, then the program is 'played' (e.g., viewed, if the program is a movie), at step 695. If the subscriber site has scheduled the program for a later time, then at step 690, the program is stored on storage device 401 for subsequent playback.

Figure 7:
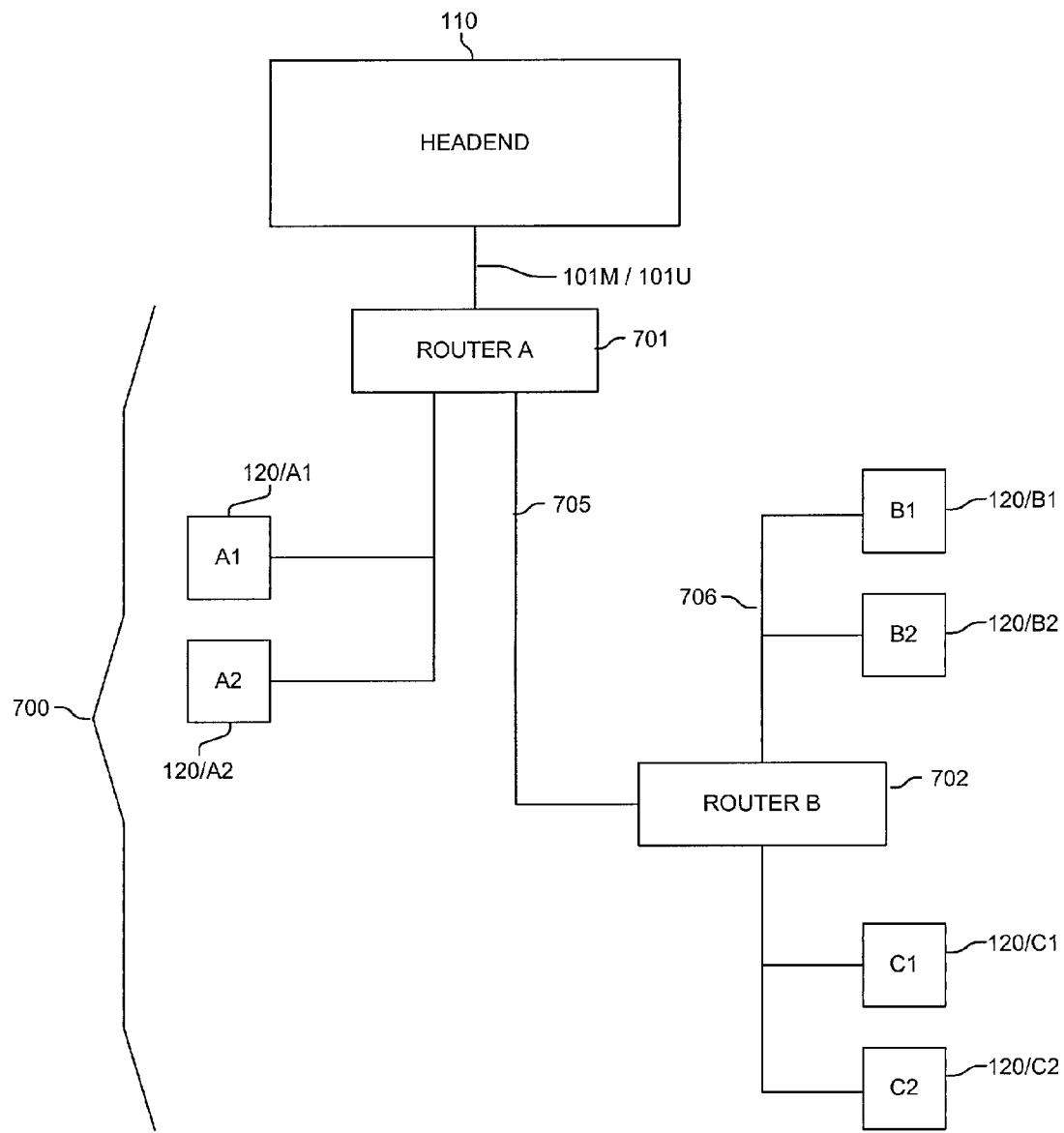
FIG. 7 is a network diagram, illustrating multicast operation of the present system.

FIG. 7 is a network diagram, illustrating multicast operation of the present system in an alternative embodiment. In the system shown in FIG. 7, an Internet link or other network 700, such as a cable network, replaces antenna 103 and transmitter/receiver 104 shown with respect to the previously described embodiments. Multicasting is essentially the transmission of a message to a group of receivers (comprising a subnet of a network) that are identified and selected via one or more routers or other devices that selectively forward the message. As described in detail below, each of these receivers must indicate whether or not it wants to receive the message. A multicast network forwards multicast data only to network subnets that have at least one receiver that has indicated it wants to receive a particular message. In contrast, broadcasting floods all subnets (i.e., the entire network) with data, thus often resulting in comparatively inefficient use of bandwidth. In the present embodiment, each receiver 120* may be viewed as comprising a subscriber unit 300 and a PC 112* or set-top box 323 and associated client application located at a subscriber site 120. Each receiver shown in FIG. 7 is thus, in effect, a subscriber site 120*.

Although signal 101M is transmitted in an IP multicast format in each of the embodiments described herein, the transmission mechanism employed by the system shown in FIGS. 1-4 is, technically, a broadcast that is selectively ignored by certain subscriber units. The networking embodiment shown in FIG. 7 includes sub-networks which allow the system to take advantage of the selective sub-networking that distinguishes multicast over broadcast. In the embodiment of FIG. 7, both unicast channels 101U and multicast channel 101M are directed to the appropriate destination subscriber sites 120* by routers 701 and 702.

In the example shown in FIG. 7, either subscriber site B1 or B2 (or both of the sites) has (or have) requested to receive a particular multicast transmission and joined the appropriate multicast group. In this situation, the requested multicast transmission is selectively forwarded via routers 701 and 702 and paths 705 and 706 to both subscriber sites B1 and B2, since both of these sites are on the same subnetwork of router B. Note that network bandwidth is conserved by avoiding transmission of the multicast data to any receivers (sites) other than those that are located on a subnetwork wherein at least one subscriber has indicated that it wants to receive a particular multicast transmission. It should also be noted that unicast data is transmitted and received by each intended recipient on network 700 simultaneously along with the selected transmission of multicast data, regardless of the subnetwork on which a particular unicast data recipient is located. For example, unicast data may be transmitted over network 700 simultaneously to subscriber sites A1, B1, and C2 simultaneously with the multicast transmission to sites B1 and B2 in the present example.

As indicated above, subscribers (clients) indicate that they would like to receive a particular transmission by joining a 'multicast group' which has been set up by a host computer 108 connected to switch 105 at the headend 110. In an exemplary embodiment of the present system, the Internet Group Management Protocol (IGMP) is used by IP host 108 to report host group memberships to any immediately-neighboring multicast routers, which in the present case, is router A (701). Multicast protocols other than IGMP, for example, PIM, PGM, MBGP, IDMR, MSDP, or SSM, may also be used to implement the multicast aspect of the present system. In the present example, multicast routers A and B (701 and 702) send Host Membership Query messages to discover which host groups have members on their attached local networks. A multicast router keeps a list of multicast group memberships for each attached network, and a timer for each membership.

A client (i.e., a software application running on a subscriber's PC 112* or set-top box 323) joins a multicast group by sending an IGMP membership report message. IGMP is common to all multicast router protocols, and isolates end users from the routing protocol in use. When a subscriber enters a request for a specific program (via a PC 112 or a keypad on set-top box 323), the client joins a multicast group by initiating two processes. First, an IGMP message (i.e., a join request) is sent to the client's local router to inform the router that the client wants to receive data sent to the group. In the embodiments shown in FIGS. 1-4, there are no downstream network routers; therefore, in these embodiments, the IGMP message sent to a 'local router' (e.g., router 208/1) at the headend 110. Next, the subscriber's appropriate PC 112* or set-top box 323 sets its IP process and network interface card (NIC) to receive the multicast on the group's address and port. Multicast addresses are Class D IP addresses ranging from 224.0.0.0 to 239.255.255.255. Class D IP addresses map automatically to IEEE-802 Ethernet multicast addresses, which simplifies the implementation of IP multicasting on Ethernet. To support the reception of multicast IP datagrams, an Ethernet module receives packets addressed to the Ethernet multicast addresses that correspond to the host's IP host group addresses. The Ethernet module listens on an arbitrary number of Ethernet multicast addresses, which may be accomplished by "opening up" the address filter to accept all multicast packets during those periods when the number of addresses exceeds the limit of the filter.

Before a subscriber (more specifically a client) can join a multicast group, the client needs to determine which group is the one in which the client is presently interested in joining. Assuming that there are a number of choices for programs to be viewed on-demand, two steps must be initially performed:

(1) the subscriber selects the program of choice via a PC 112 or a keypad on set-top box 323; and (2) the subscriber PC or set-top box client software then correlates the program selected by the subscriber with a specific group ID (previously sent to the subscriber with, for example, a program list).

If the join request is granted, the subscriber client as well as all intermediate routers (if any) in the path between the client and the headend begin passing the requested multicast stream through where it is interleaved with other data from the unicast channel onto the subscriber's ethernet bus 325. If a movie or other programming is already in progress, then the client simply allows those packets to pass (much like tuning a TV to a particular channel).

A request is required to initiate transmission of the movie if no one else on the subscriber's subnetwork has done so. As described above with respect to FIG. 6, the program request is sent to the headend 110, where it is processed by return channel server 212. After being transmitted to the appropriate subnetwork(s), the multicast channel is then received, demodulated and multiplexed onto an ethernet connection for receipt by all devices connected to the subscriber's local (e.g., Ethernet) network, as described with respect to FIGS. 3-5.

When a client/subscriber leaves a group, where the client was the only one receiving the multicast on a particular subnetwork, the local router stops sending data to the client's subnetwork, thereby freeing bandwidth on that portion of the network. The process of leaving a group is not shown on the flowchart in FIG. 6, but this can be accomplished either explicitly by the client, or by a local router, via time-out of a timer.

While exemplary embodiments of the present invention have been shown in the drawings and described above, it will be apparent to one skilled in the art that other practicable embodiments of the present invention are possible. For example, the specific configuration of the headend and subscriber sites as well as the various protocols employed and the particular flowchart steps and sequences thereof described above should not be construed as limited to the specific embodiments disclosed herein. Modification may be made to these and other specific elements of the invention without departing from its spirit and scope as expressed in the following claims.

What is claimed is:

1. A wireless communication system comprising:
 a network transceiver configured to:
  receive a unicast signal;
  receive a multicast signal;
  process the unicast signal to generate a first wireless radio frequency (RF) signal modulated with the unicast signal;
  process the multicast signal to generate a second wireless RF signal modulated with the multicast signal; and
  simultaneously transmit the first wireless RF signal and the second wireless RF signal via a plurality of non-multiplexed channels; and
 a subscriber unit configured to simultaneously receive the first wireless RF signal and the second wireless RF signal, demodulate the first wireless RF signal into the unicast signal, demodulate the second RF signal into the multicast signal, multiplex the unicast signal and the multicast signal onto a local network for delivery of the unicast signal to a first device on the local network and delivery of the multicast signal to the first device and a second device on the local network.

2. The wireless communication system of claim 1 wherein the subscriber unit is further configured to join a multicast transmission of the multicast signal.

3. The wireless communication system of claim 2 wherein the unicast signal comprises an Internet transmission.

4. The wireless communication system of claim 3 wherein the multicast signal comprises a television signal.

5. The wireless communication system of claim 4 further comprising the first device, wherein the first device comprises a first network interface card configured to receive the unicast signal and a second network interface card configured to receive the multicast signal.

6. The wireless communication system of claim 1 wherein the multicast signal comprises video.

7. The wireless communication system of claim 6 wherein the unicast signal comprises data.

8. A method of wireless communication, the method comprising:
 in a network transceiver:
  receiving a unicast signal;
  receiving a multicast signal;
  processing the unicast signal to generate a first wireless radio frequency (RF) signal modulated with the unicast signal;
  processing the multicast signal to generate a second wireless RF signal modulated with the multicast signal;
  simultaneously transmitting the first wireless RF signal and the second wireless RF signal via a plurality of non-multiplexed channels; and
 in a first subscriber unit:
  simultaneously receiving the first wireless RF signal and the second wireless RF signal;
  demodulating the first wireless RF signal into the unicast signal;
  demodulating the second RF signal into the multicast signal; and
  multiplexing the unicast signal and the multicast signal onto a local network for delivery of the unicast signal to a first device on the local network and delivery of the multicast signal to the first device and a second device on the local network.

9. The method of claim 8 further comprising:
 in the subscriber unit, joining a multicast transmission of the multicast signal.

10. The method of claim 9 wherein the unicast signal comprises an Internet transmission.

11. The method of claim 10 wherein the multicast signal comprises a television signal.

12. The method of claim 11 further comprising:
 in the first device, receiving the unicast signal via a first network interface card and receiving the multicast signal via a second network interface card.

13. The method of claim 8 wherein the multicast signal comprises video.

14. The method of claim 13 wherein the unicast signal comprises data.

* * * * *